United States Patent
Stritzel

(10) Patent No.: US 10,836,158 B2
(45) Date of Patent: Nov. 17, 2020

(54) METHOD FOR DENSITY FLUCTUATION COMPENSATION IN AN INKJET PRINTING MACHINE

(71) Applicant: HEIDELBERGER DRUCKMASCHINEN AG, Heidelberg (DE)

(72) Inventor: Bernd Stritzel, Goosefeld (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 16/387,061

(22) Filed: Apr. 17, 2019

(65) Prior Publication Data

US 2019/0351674 A1    Nov. 21, 2019

(30) Foreign Application Priority Data

May 17, 2018   (DE) .......................... 10 2018 207 728

(51) Int. Cl.
     *B41J 2/045*      (2006.01)
     *B41J 2/21*      (2006.01)

(52) U.S. Cl.
     CPC ....... *B41J 2/04536* (2013.01); *B41J 2/04581* (2013.01); *B41J 2/2103* (2013.01)

(58) Field of Classification Search
     CPC .. B41J 2/04536; B41J 2/2103; B41J 2/04581; H04N 1/4015; H04N 1/405
See application file for complete search history.

(56) References Cited

U.S. PATENT DOCUMENTS

| | | | |
|---|---|---|---|
| 5,805,305 A | 9/1998 | Abe | |
| 6,213,579 B1 | 4/2001 | Cornell et al. | |
| 6,364,446 B1 * | 4/2002 | Ishikawa | G06K 15/107 347/15 |
| 7,370,929 B2 | 5/2008 | Kitagawa | |
| 7,643,178 B2 | 1/2010 | Yamada et al. | |
| 8,616,668 B2 | 12/2013 | Saito et al. | |
| 8,733,874 B2 | 5/2014 | Baba | |
| 8,899,715 B2 | 12/2014 | Saito et al. | |
| 8,953,234 B2 | 2/2015 | Iguchi et al. | |

(Continued)

FOREIGN PATENT DOCUMENTS

| | | |
|---|---|---|
| DE | 69525017 T2 | 7/2002 |
| DE | 69931065 T2 | 4/2007 |

(Continued)

*Primary Examiner* — Bradley W Thies
(74) *Attorney, Agent, or Firm* — Laurence A. Greenberg; Werner H. Stemer; Ralph E. Locher

(57) ABSTRACT

A method for compensating for position-dependent density fluctuations in an inkjet printing machine includes the steps of assigning, by using a look-up table, specific halftone patterns to specific gray values of a color separation to be screened of an image in the course of the calibration of a raster image processor of the inkjet printing machine, using the halftone patterns in the image screening process by using the computer and printing the halftone image on the inkjet printing machine. The look-up table contains the position of every printing nozzle of the print heads in the inkjet printing machine as an additional variable and the computer enters a complete set of gray values with associated adapted halftone patterns into the look-up table for every position of a printing nozzle.

9 Claims, 5 Drawing Sheets

(56) References Cited

U.S. PATENT DOCUMENTS

| | | |
|---|---|---|
| 9,924,075 B2 | 3/2018 | Sato |
| 2004/0130753 A1 | 7/2004 | Crounse |
| 2006/0126121 A1* | 6/2006 | Chung .................. H04N 1/405 |
| | | 358/3.06 |
| 2010/0321443 A1 | 12/2010 | Baba |
| 2013/0176600 A1 | 7/2013 | Chandu et al. |
| 2017/0081444 A1 | 3/2017 | Wang et al. |

FOREIGN PATENT DOCUMENTS

| | | |
|---|---|---|
| EP | 1435728 A2 | 7/2004 |
| EP | 1814302 A2 | 8/2007 |

* cited by examiner

METHOD FOR DENSITY FLUCTUATION COMPENSATION IN AN INKJET PRINTING MACHINE

CROSS-REFERENCE TO RELATED APPLICATION

This application claims the priority, under 35 U.S.C. § 119, of German Patent Application DE 10 2018 207 728.2, filed May 17, 2018; the prior application is herewith incorporated by reference in its entirety.

BACKGROUND OF THE INVENTION

Field of the Invention

The invention relates to a method for compensating for position-dependent density fluctuation in an inkjet printing machine.

The technical field of the invention is the field of inkjet printing.

In inkjet printing, an important quality aspect is to obtain a clear and well-defined representation of the image content or subject. In that context, the representation is to lead to the same result at all locations within the printable format, a feature that requires a local homogeneity of the print. A difficulty in inkjet printing is to ensure the required homogeneity in a direction transverse to the printing direction (x-track). As a rule, inkjet print heads exhibit a certain jetting variation between the individual nozzles. That variation is caused by manufacturing variation, variation in the ink supply to the nozzles, and mechanical variation of the piezoelectric actuators, etc. All of those factors result in density/coloration inhomogeneity across the print head despite an identical treatment of all nozzles.

That problem is solved with the aid of density compensation methods. Density inhomogeneity despite a uniform actuation of all nozzles is determined by test charts for a specified number of area coverages. Compensation profiles are determined on the basis of the density values transverse to the printing direction. In a printing operation, those compensation profiles are used in a corresponding way to achieve a homogeneous representation.

On the subject of density compensation in inkjet printing machines, U.S. Pat. Nos. 8,616,668 and 8,899,715 disclose a method for compensating for density fluctuations including the step of printing a first image. The first image is examined by a user to find potential density fluctuations. The density fluctuations are detected, specified in terms of size and expansion, and compensated for in a computer-assisted way by using a correction table. That correction table is then used to create a second image that is printed and likewise examined to find potentially persisting density fluctuation. If the corresponding changes are found to have been effective, the correction values that have proven effective are entered into the table and used in a continuous process of correcting local density fluctuations in the production run.

Two general approaches to addressing the density fluctuation problem are known in the art. They are different from one another and are in use in existing printing systems:

1. Compensation in the Gray Value Images (Continuous Tone Separations) of the Separated Color Separations Prior to the Screening Process (Pre-Compensation)

Process: With the aid of the compensation profiles, the gray values in a color separation are modified as a function of their target values, positions in the image in a direction transverse to the printing direction, and the associated compensation values from the profile in order to obtain the target value in the print. Since that information is only discretely available for ten area coverages, for instance, interpolation is used to represent the required parameters. The color separations are not screened until after they have been modified.

Advantages: The representational characteristics of the halftone are maintained in that way; graininess, noise, profiles, etc. in particular are not affected. The area coverage, which is required for the calculation, is known at high resolution from the image content and does not need to be determined expressly for the purpose like in the second method.

Disadvantages: The compensation process needs to take place before the screening process, i.e. changes to the compensation profile require a re-screening, which is relatively time-consuming and can only to a limited extent be done online. Shifting the print in a direction transverse to the printing direction and thus relative to the printing units also requires the image to be re-screened. Conversely, changes to the transverse register or to the position of the sheet/web in the machine in a direction transverse to the printing direction are practically impossible because the local compensation values are shifted relative to the print heads together with the image and are thus no longer in the correct positions. In addition, the color values are generally only available at an 8-bit resolution, resulting in quantization effects when used in a representation that likewise has an 8-bit target value range. The input values thus need to be converted to a higher-resolution value range by suitable transformations.

An example of that approach is disclosed in U.S. Pat. No. 8,733,874. That document discloses a method for calibrating an inkjet printing machine to correct density fluctuation. The method that is disclosed therein refers to an adaptation of the existing gray values, i.e. it corresponds to the first approach described above.

2. Compensation in the Halftone of the Individual Color Separation (Online Compensation)

Method: In accordance with that method, density compensation is done on the basis of the halftone of the color separation. The first step is to determine the actual area coverage at the location to be compensated in the image on the basis of the halftone. That is not done at high resolution on the basis of the image information but by using a matrix, such as a window across 3×9 pixels across the entire halftone image, i.e. by averaging a number of halftone dots. The area coverage is then used to calculate the associated compensation profile/the local value by interpolation; then the pixel values, distribution and intensity are adapted in such a way that the target image value is attained. That process is done online in the course of an ongoing printing operation. The increase or decrease of the image values is done by setting or eliminating dots or by increasing or decreasing the dot size through the jetted drop volume.

Advantages: That compensation process is done online and is very quick because it is done on the fly and does not require the printing operation to be stopped. The image may be shifted relative to the print heads without any problems, for instance when the halftone is modified.

Disadvantages: In combination with the method, a determination of the local area coverage across a shifting window may result in artifacts at the margins of area or line elements. Since the corrective measures interfere with the halftone image, the halftone is changed. Especially major corrections may thus have a detrimental effect in the form of structures, graininess, noise, or other artifacts. The halftone algorithm is optimized for image characteristics such as homogeneity, resolution, smoothness, robustness, etc. Interfering with the layout of the halftone may result in a loss of quality.

Another problem that occurs in inkjet printing is the occurrence of so-called white lines, which are stripe-like artifacts in the printing direction caused by a malfunctioning or failure of individual printing nozzles. There are specific approaches to compensating for such defects. Those approaches may likewise be implemented on the fly in the halftone during an ongoing printing operation in addition to density fluctuation compensation. In a case in which a local accumulation of white lines needs to be compensated for, density compensation is especially difficult. Frequently, some visually visible inhomogeneity remains. Thus, white line compensation also has an effect on density fluctuation compensation. Consequently, white lines that have occurred and the compensatory measures to be taken thus need to be taken into consideration in a method for compensating for local density fluctuations.

SUMMARY OF THE INVENTION

It is accordingly an object of the invention to provide a method for density fluctuation compensation in an inkjet printing machine, which overcomes the hereinafore-mentioned disadvantages of the heretofore-known methods of this general type and which compensates for occurring density fluctuation in a more efficient way than the methods known heretofore to provide improved compensation.

With the foregoing and other objects in view there is provided, in accordance with the invention, a method for compensating for position-dependent density fluctuations in an inkjet printing machine by using a computer, comprising the steps of assigning, by using a look-up table, specific halftone patterns to specific gray values of a color separation to be screened of an image in the course of the calibration of a raster image processor of the inkjet printing machine, using those halftone patterns in the image screening process by using the computer, and printing the halftone on the inkjet printing machine. The method is distinguished in that the look-up table contains the position of every printing nozzle of the print heads in the inkjet printing machine as an additional variable and the computer enters a complete set of gray values with associated adapted halftone patterns into the look-up table for every position of a printing nozzle.

The method of the invention is based on the fact that the halftones that are used in the screening process need to be calibrated anyway. Instead of using a look-up table that assigns a specific halftone pattern to every gray value in the course of the screening process, the position of every one of the printing nozzles is fed to the screening process. This allows making the calibration process, i.e. the process of assigning a specific gray value to a specific halftone pattern, dependent on the performance of the respective printing nozzles. For instance, if a printing nozzle prints a little more weakly than expected, the density compensation process requires increasing the amount of ink. In this case, a halftone having a correspondingly increased amount of ink may be assigned to the nozzle in question to counterbalance the density fluctuation effect. Thus, the calibration process, which is necessary in any case, is simultaneously used to compensate for local density fluctuation. It goes without saying that to do this, the density fluctuation of the individual printing nozzles needs to be known before the calibration process. For this purpose, density fluctuation measurements need to be taken beforehand. Since density compensation is a continuous process, however, the current density fluctuation values of the individual printing nozzles need to be determined at regular intervals anyway. In addition, the introduction of the printing nozzle position as a possible parameter in the look-up table expands the latter in the form of a matrix, i.e. there is no longer just one look-up table assigning a specific halftone to every gray value, but there are n look-up tables (where n depends on the number of positions used for every printing nozzle).

Advantageous and thus preferred further developments of the method will become apparent from the associated dependent claims and from the description together with the associated drawings.

Another preferred development of the method of the invention in this context is that for every position of a printing nozzle in the look-up table, the adapted allocation of halftone patterns to gray values is dependent on the density fluctuation of the respective printing nozzle. This adapted allocation ensures that the local density fluctuation that every printing nozzle exhibits may be efficiently compensated by the calibration of the halftone. For instance, if a corresponding printing nozzle jets too little ink, resulting in a color value that is too low in the printed image, this density fluctuation may be compensated for by an adapted allocation of the halftone to the desired gray value. Since the density fluctuation, in the given example a resultant color value that is too low, is already known when the calibration process takes place, the halftone value that is used for the corresponding gray values of the printing nozzle in question, i.e. the position, is higher than it would normally be to compensate for the hypofunction of the printing nozzle in a corresponding way.

A further preferred development of the method of the invention in this context is that the density fluctuation of the printing nozzles of the inkjet printing machine is represented by a density profile that is used to calculate the allocation of halftone patterns to gray values for every position of a printing nozzle in the look-up table by using the computer. It goes without saying that the density fluctuation of the printing nozzles needs to be known to carry out the method of the invention. A density profile is best suited for use in the calibration process, i.e. in the allocation of halftones to gray values in the course of the calibration process. The density profile is generally created by test measurements taken before the method of the invention is carried out. A density profile precisely indicates the ink volume jetted by every printing nozzle or every printing nozzle area, thus providing the resultant color values created by the respective printing nozzles. The resultant density profile thus contains the corresponding density fluctuation of the printing nozzles that are used and/or of the respective inkjet print heads that are used.

An added preferred development of the method of the invention in this context is that in the look-up table, the computer uses the same set of gray values with associated adapted halftone patterns for a respective region of neighboring printing nozzle positions. If it is not necessary/desired to use a separate look-up table for every position of the printing nozzle, the same set of gray values with the correspondingly associated halftone patterns may be assigned to multiple neighboring printing nozzle positions. This may be the case, for instance, if the density fluctuations occur rather sluggishly, i.e. if there is not a high degree of density fluctuation from one printing nozzle to another. Another aspect is to minimize the data administration effort by avoiding the allocation of a separate look-up table for every printing nozzle position and by having multiple neighboring printing nozzles share a look-up table with a corresponding gray value/halftone pair instead. This measure would provide a much more efficient calibration because it reduces the data administration effort in a corresponding way.

An additional preferred development of the method of the invention in this context is that the same set of gray values with associated adapted halftone patterns in the look-up table uses halftone patterns that are adapted to an average value, with the average value dependent on the density fluctuations of the printing nozzles in the region. A possible more advanced approach is to not only provide the same set of gray values and associated halftone patterns for areas of neighboring printing nozzle positions in the look-up table, but also to adapt the corresponding associated halftone patterns to an average that is dependent on the density fluctuations of the printing nozzles in the region. As a result, regions of printing nozzle positions that share a set of adapted halftone patterns in the look-up table do not change too abruptly when the transition is made to the next region with a new look-up table. The use of averages thus provides a smoother transition, consequently reducing artifacts that a rough transition might cause.

Another preferred development of the method of the invention in this context is that in the case of a multi-color print, the computer implements the method of the invention for every color separation. In the case of a multi-color print, a separate matrix with a look-up table with a gray value/associated halftone pattern pair of values as well as positions for every printing nozzle that contributes to the printing of the color separation is created and used.

An added preferred development of the method of the invention in this context is that 12-bit halftone patterns are allocated to 8-bit gray values in the look-up table, resulting in 4096 halftone patterns respectively facing or corresponding to 256 gray values. Thus, quantization occurs in the look-up table. In this process, the halftone pattern that is most suited is allocated to each one of the 256 gray values from a pool of 12-bit halftone patterns, i.e. from 4096 available halftone patterns. Theoretically, gray values bit-coded in a different way are likewise possible. The number of respective gray values and halftone patterns is of minor importance to the method of the invention. An important aspect is to assign specific halftone patterns to a respective specific position or region of positions of printing nozzles and to implement the calibration and simultaneously the compensation for density fluctuations based thereon. For instance, if the number of halftone patterns is not 4096 but a different number of halftones, this would be possible without any difficulty.

A concomitant preferred development of the method of the invention in this context is that a maximum ink limit is implemented by causing the computer to assign lower halftone patterns to higher gray values than would be the case in an equidistant normal distribution. In inkjet printing, so-called maximum ink limits apply because in contrast to lithographic offset printing, color separations cannot be printed on top of one another virtually without any limit. Too much ink at a specific location on the printing substrate has negative effects, for instance in terms of the drying behavior or the state of the printing substrate. Limiting the maximum amount of ink may be easily implemented in the course of the calibration. Instead of assigning higher halftone patterns with a very high ink volume, e.g. a maximum value of 4095, to higher gray values such as the highest gray value 255, one intervenes at this point. A value of 4095 would result in such a high volume of ink that the maximum ink limit would already be exceeded. Therefore, in the course of the calibration, the halftone patterns that are assigned to the higher gray values are not the higher ones that would correspond to an equidistant distance in the case of 8-bit gray values and 12-bit halftone patterns. Instead, correspondingly lower halftone patterns are used. For a gray value of 255, for instance, a number 3172 halftone pattern would be entirely sufficient. An important aspect in this context is that the required distance reduction between the individual halftone patterns that are assigned to the rising gray values is implemented in such a way that color fidelity, i.e. the target color values to be attained in the print job in question, is maintained.

Other features which are considered as characteristic for the invention are set forth in the appended claims.

Although the invention is illustrated and described herein as embodied in a method for density fluctuation compensation in an inkjet printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
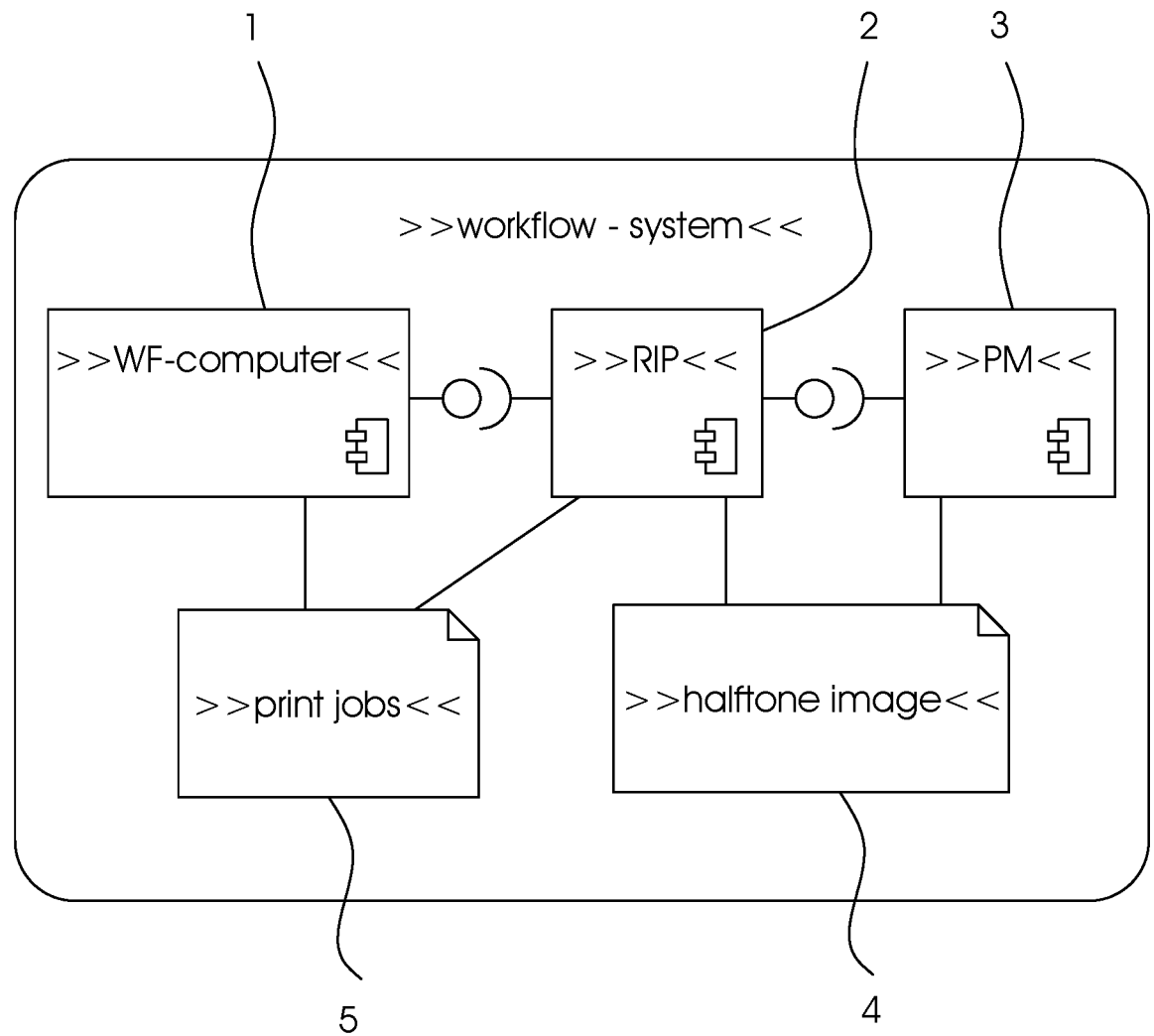
FIG. 1 is a block diagram illustrating an example of the structure of an inkjet printing machine system.

Referring now in detail to the figures of the drawings, in which mutually corresponding elements have the same reference symbols, and first, particularly, to FIG. 1 thereof, it is seen that the method of the invention is implemented on an inkjet printing machine 3 that is included in a specific workflow system. An example of such a workflow system is shown by way of example in FIG. 1. The workflow system runs on one or more computers 1 for processing the print jobs 5 in question. A print job 5 that is to be printed on an inkjet printing machine 3 is screened by a raster image processor 2, which then forwards halftone images 4 to the inkjet printing machine 3 for a corresponding production run. The raster image processor 2, which likewise runs on the computer 1, implements a calibration in accordance with the invention between gray values of individual color separations of a pre-print image and corresponding halftone patterns 7 that form the screened halftone 4. In accordance with the invention, a compensation for local density fluctuations 8 that occur in the inkjet printing machine 3 is likewise done in the raster image processor 2.

Figure 4:
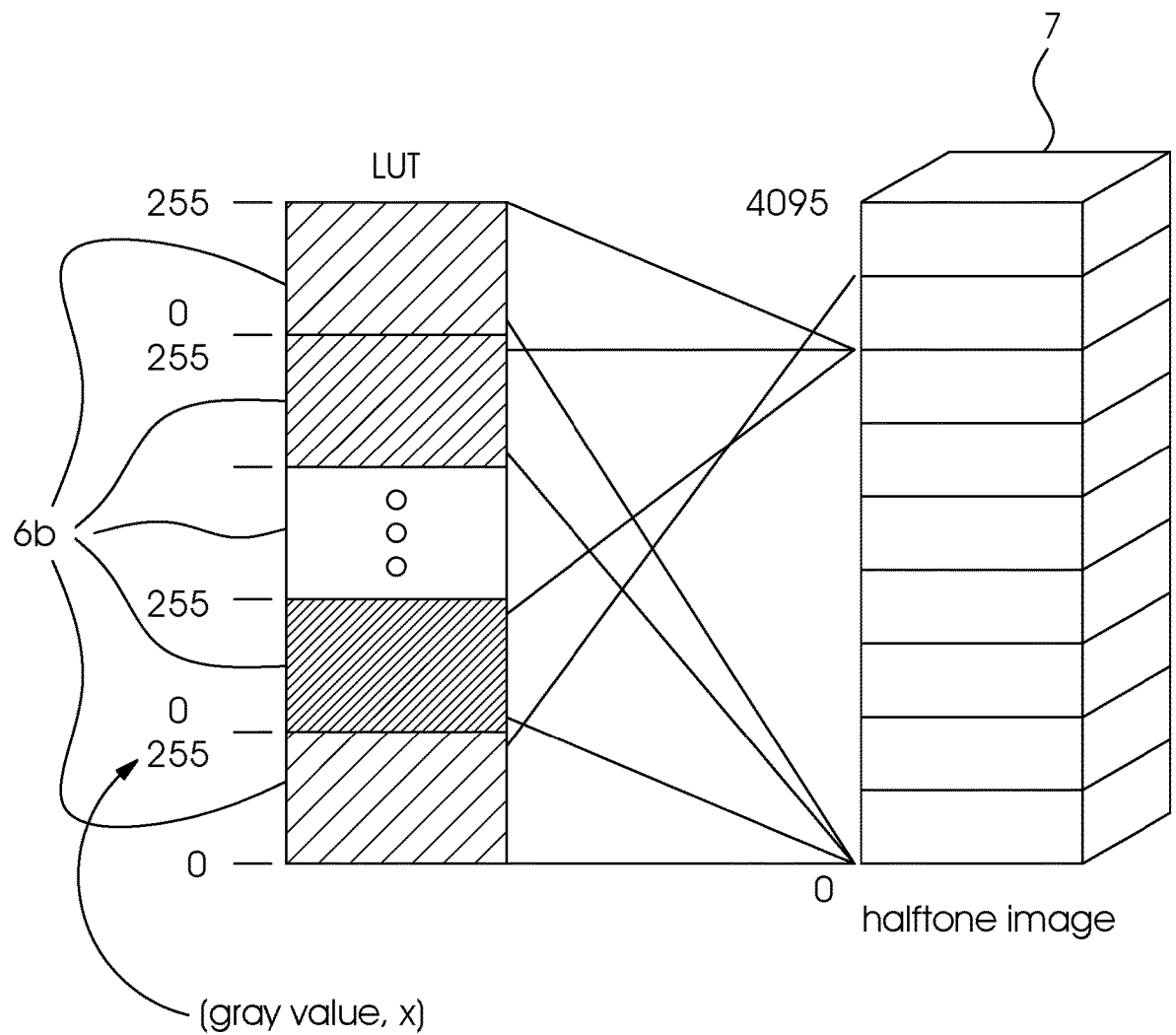
FIG. 4 is a perspective view illustrating an example of a screening process with calibration and density compensation.
Figure 5:
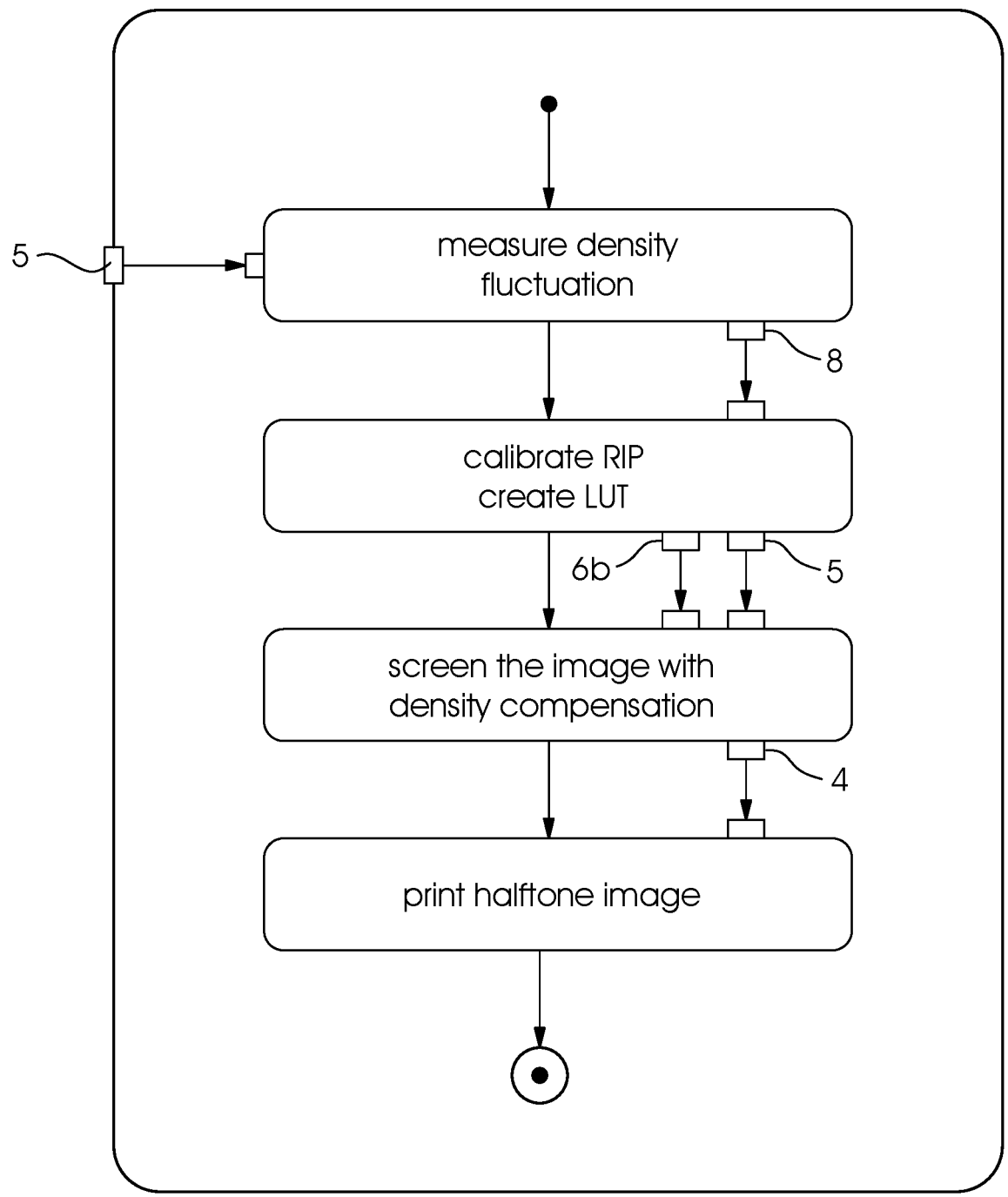
FIG. 5 is a flow chart of the method of the invention.

A flow chart of the preferred embodiment of the method of the invention is schematically shown in FIG. 5. The first step is to measure the corresponding density fluctuations 8 of the respective inkjet printing machine 3. In this process, the corresponding density profile of the inkjet machine 3 in question is created. Then these data and the corresponding pre-print data of the print job 5 are then used to process the calibration of the halftone patterns 7. The calibration also includes compensating for the density fluctuation 8 that occurs in the printing machine 3. This is achieved by creating a corresponding look-up table 6b, which not only includes gray value/suitably adapted halftone pattern 7 value pairs in a matrix-like way, but also the position of the corresponding printing nozzles of the print heads that are used in the inkjet printing machine 3 as an additional parameter. Thus, a matrix of look-up tables 6b is created. In an extreme case, a separate look-up table 6b is created for every position of a printing nozzle. The structural layout of such a look-up table 6, 6a, 6b is described in more detail with the aid of FIGS. 2 to 4.

Figure 2:
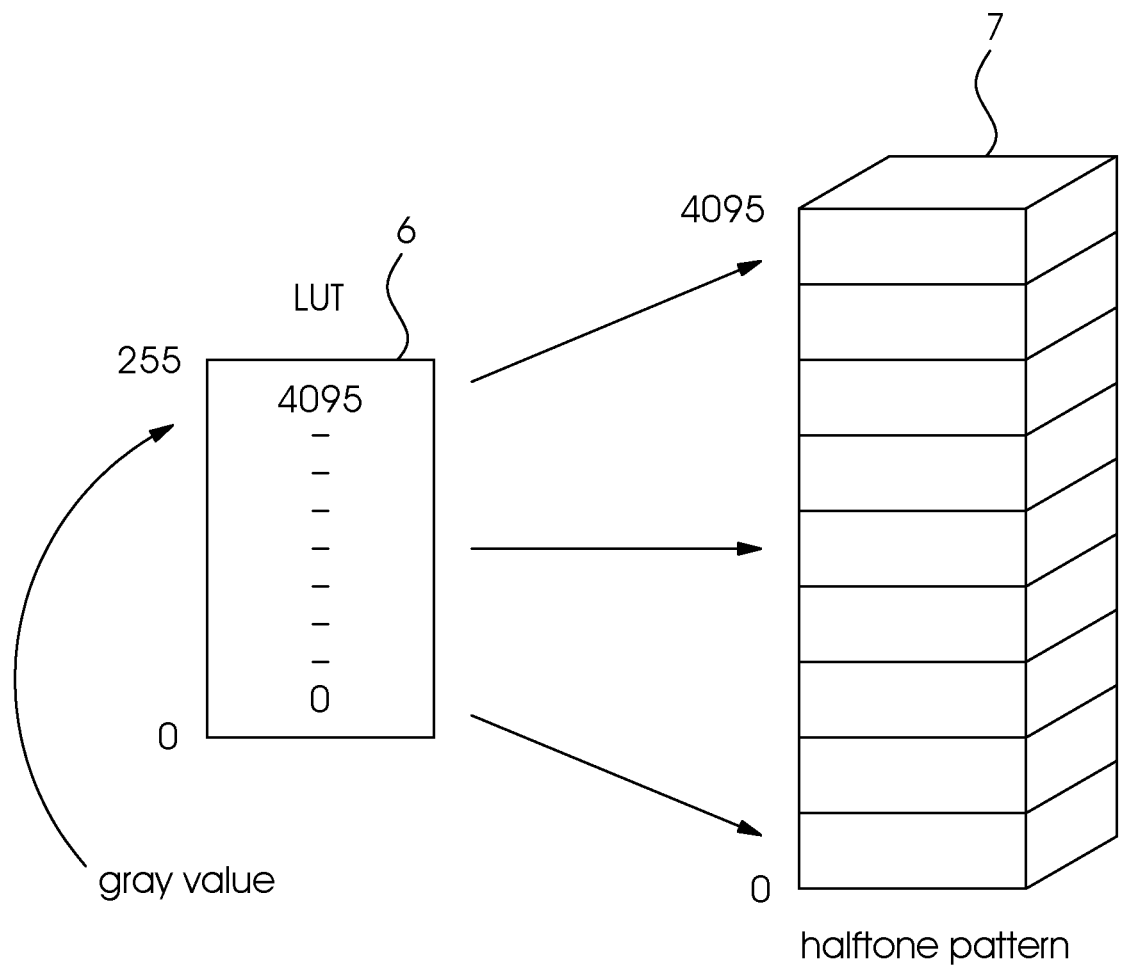
FIG. 2 is a perspective view illustrating an example of a standard screening process.

FIG. 2 illustrates how a screening process without calibration progresses. It is shown that every gray value from 0 to 255 is assigned a specific halftone pattern 7. There are 4096 different halftone patterns 7, which are the result of the number of ink drop sizes available on the inkjet printing machine 3 and the individual halftone pixels contained in an individual halftone pattern 7. A look-up table 6 in the raster image processor 2 assigns a specific halftone pattern 7 to every gray value that occurs in the not-yet screened image. Without calibration, the corresponding steps in the allocation are equidistant in this process. This means that a halftone pattern 0 is assigned to gray value 0 because gray value 0 corresponds to an absence of the color in question. Consequently, the no pixel must be set in the associated halftone pattern 7. Gray value 1 then corresponds to halftone pattern 16, etc. up to gray value 255, which corresponds to halftone pattern 4095. In this context, the distance between the individual steps is dependent on the resolution or resolution differential between the pre-print image and the halftone image 4. In the case of the values in the example, which refer to an 8-bit gray value and a 12-bit halftone pattern, it is 16.

Figure 3:
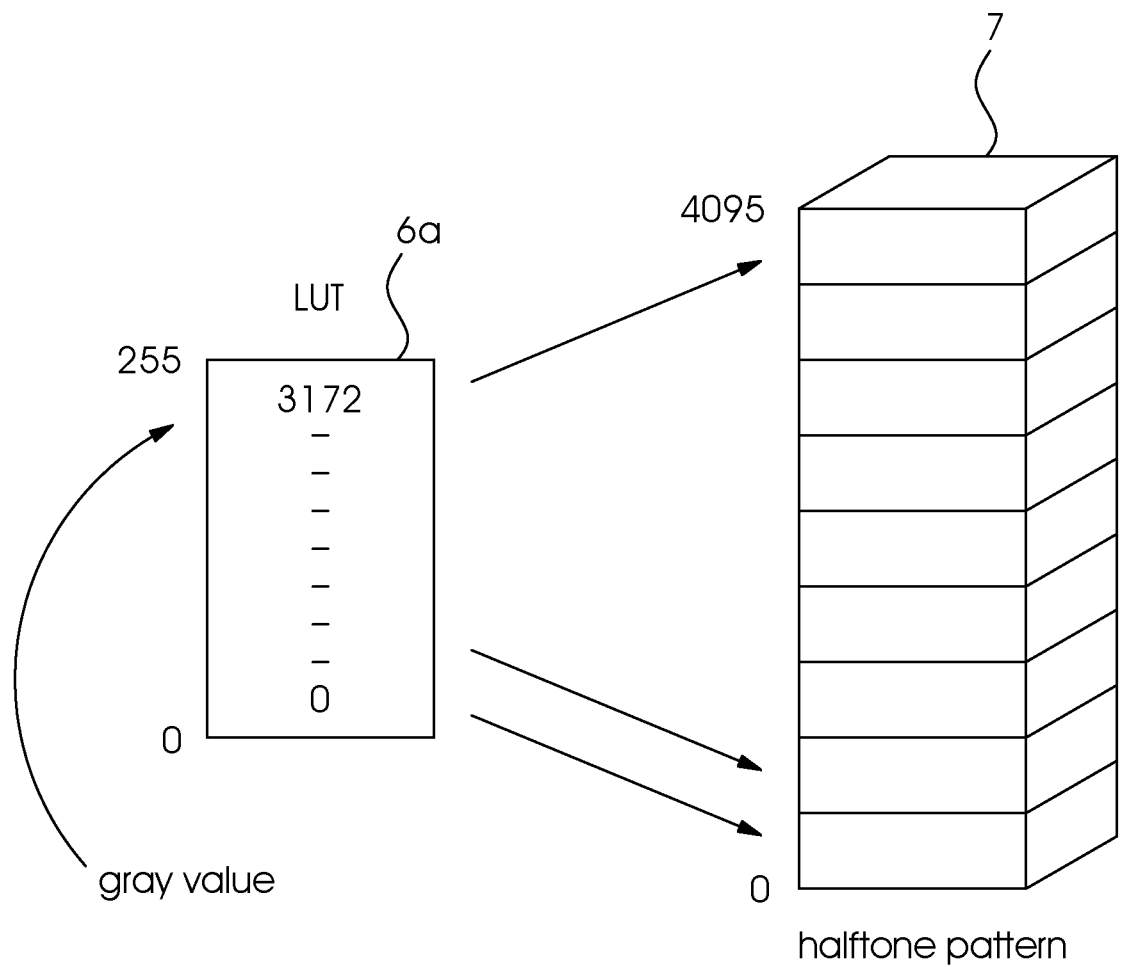
FIG. 3 is a perspective view illustrating an example of a screening process with calibration.

FIG. 3 illustrates an example of a screening process with calibration and the introduction of an ink limit. The method corresponds to the one without calibration but there is no longer an equidistant distance between the individual halftone pattern 7/gray value allocations. Instead, an adapted allocation is made. For instance, the maximum gray value 255 no longer corresponds to halftone pattern 4095, but to halftone pattern 3172. This ensures that the maximum amount of ink that is applied in the printing operation does not rise to unacceptable values. In the course of the calibration process, the distance between the individual halftone patterns 7 that are assigned to the respective gray values may be adapted from gray value to gray value. The details of the adaptation depend on the state of the corresponding inkjet printing machine 3 and on the print job 5 to be completed.

FIG. 4 in turn shows how the calibration is adapted to compensate for density fluctuation. In this example, there is no longer just one look-up table 6, 6a in which gray values 0 to 255 use specific halftone patterns 7 in a correspondingly adapted way. Instead, in addition to the gray value, the position of the respective printing nozzles as determined in the density profile that has been created to indicate the density fluctuations 8 in the inkjet printing machine 3 is factored in. For a nozzle position X, for example, the set of gray values from 0 to 255 is assigned to a corresponding set of halftone patterns from 0 to 4095. For the next printing nozzle X+1, a further set of gray values 0 to 255 is assigned to the corresponding halftone patterns 7. For all printing nozzles that contribute to the print job 5 and therefore require density fluctuation compensation, a corresponding set of gray value/halftone pattern 7 value pairs is created.

In a separate embodiment, a creation of a look-up table 6b is possible even without the data of the current print job 5. The only thing that is required for density fluctuation compensation in accordance with the invention is the density profile that has been created and contains the local density fluctuations 8 of the inkjet printing machine 3.

Once the raster image processor 2 has been calibrated in accordance with the invention, the look-up tables 6b that have been created in this way to factor in the positions of the individual printing nozzles may be used to screen the print job 5. As a consequence, the halftone image 4 that has been created based thereon already includes machine-specific density fluctuation compensation 8 for the inkjet printing machine 3 in question. Thus, the image 4 that has been screened in this way may be printed with density compensation.

The following is a summary list of reference numerals and the corresponding structure used in the above description of the invention:

1 computer
2 raster image processor (RIP)
3 inkjet printing machine
4 halftone image
5 print job
6 look-up table (LuT)
6a calibrated look-up table (LuT)
6b matrix of position-dependent calibrated look-up tables (LuT)
7 halftone pattern
8 density fluctuation

The invention claimed is:

1. A method for compensating for position-dependent density fluctuations in an inkjet printing machine, the method comprising the following steps:
    using a look-up table to assign specific halftone patterns to specific gray values of a color separation to be screened of an image in a course of a calibration of a raster image processor of the inkjet printing machine;
    using a computer to incorporate the halftone patterns in an image screening process;
    including a position of every printing nozzle of the print heads in the inkjet printing machine as an additional variable in the look-up table;
    using the computer to enter a complete set of the gray values with the associated adapted halftone patterns into the look-up table for every position of a printing nozzle; and
    printing a halftone image on the inkjet printing machine.

2. The method according to claim 1, which further comprises adapting an allocation of the halftone patterns to the gray values in dependence on the density fluctuation of a respective printing nozzle for every position of a printing nozzle in the look-up table.

3. The method according to claim 2, which further comprises using a density profile to represent the density fluctuation of the printing nozzles of the inkjet printing machine, and using the computer to utilize the density profile to calculate the allocation of halftone patterns to gray values for every position of a printing nozzle in the look-up table.

4. The method according to claim 3, which further comprises creating the density profile created in test measurements.

5. The method according to claim 2, which further comprises using the computer to utilize an identical set of gray values with associated adapted halftone patterns in the look-up table for a region of neighboring printing nozzle positions.

6. The method according to claim 5, which further comprises using halftone patterns adapted to an average value for the same set of gray values with associated adapted halftone patterns in the look-up table, the average value being dependent on the density fluctuations of the printing nozzles in the region.

7. The method according to claim 1, which further comprises using the computer to implement the method for every color separation in a multi-color printing operation.

8. The method according to claim 1, which further comprises allocating 12-bit halftone patterns to 8-bit gray values in the look-up table, resulting in 4096 halftone patterns corresponding to 256 gray values.

9. The method according to claim 8, which further comprises using the computer to assign lower halftone patterns to higher gray values than would occur in an equidistant normal distribution, in order to implement a maximum ink limit.

* * * * *